Curt Weidauer
Maxwell E. Sparrow

United States Patent Office

3,170,375
Patented Feb. 23, 1965

---

3,170,375
MACHINE TOOL FOR MILLING PINKING
SHEAR BLADES
Curt Weidauer, Clinton Corners, N.Y., assignor to
Samuel Briskman, New York, N.Y.
Filed Aug. 3, 1962, Ser. No. 214,603
2 Claims. (Cl. 90—15.1)

This invention relates to machine tools and particularly to a milling machine for the manufacturing of the blades of pinking shears.

It is known that the cutting contours of the blades of pinking shears have to be manfactured to a high degree of precision, and special tools, fixtures and machine tools have been invented and designed for manufacturing these blades. However, they have not been suitable for a continuous flow of production and merely have been operated in single operations whereby inevitably small differences in dimensions were apt to occur, and thus close manufacturing tolerances could not be held. This invention provides a new machine for these manufacturing purposes. It consists in such novel features, construction arrangements, combinations of parts and improvements as may be shown and described in connection with the apparatus herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

It is the general object of this invention to provide new and useful contrivances for milling the serrations in the blades of pinking shears or the like.

A further object of the invention is to provide means for a continuous, step-by-step operation for manufacturing the serrations of said blades.

Yet another object of the invention is to provide fixture means for the blades of pinking shears for holding said blades firmly until all milling operations have been completed.

Furthermore, it is an object of the invention to provide such construction arrangement in a milling machine for milling the serrations of the blades of pinking shears as to insure a consistent precision of the finished product which is independent from the skill and special attention of the operator.

Various further and more specific purposes, features and advantages will clearly appear from the detailed description given below taken in connection with the accompanying drawings which form part of this specification and illustrate merely by way of example one embodiment of the device of the invention.

Figure 1:
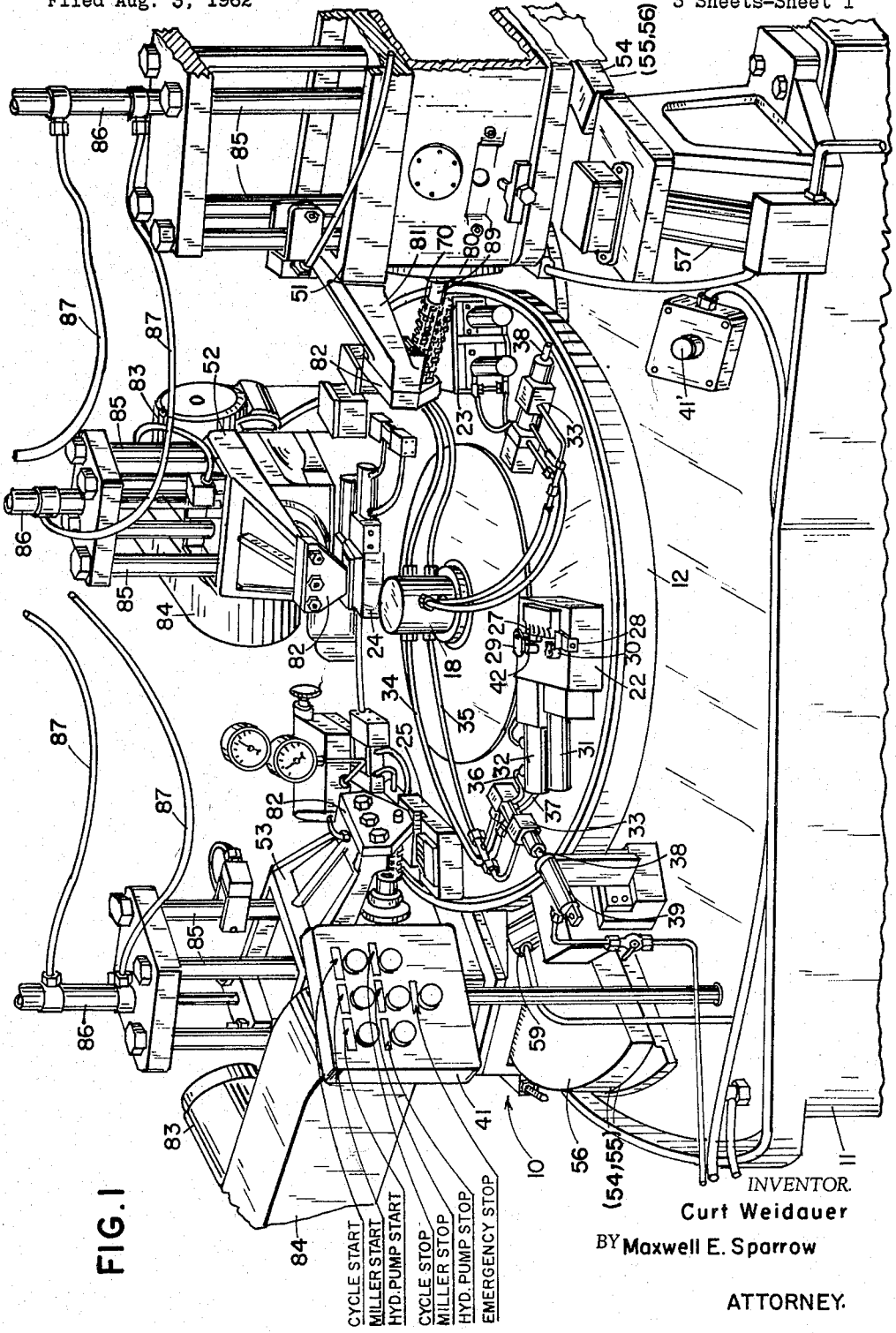
FIG. 1 is a view of the milling machine seen in perspective.

In the following description and in the claims, parts will be identified by specific names for convenience, but such names are intended to be as generic in their application to similar parts as the art will permit. Like reference characters denote like parts in the several figures of the drawings.

In FIG. 1 an overall view of the milling machine 10 is shown, in perspective, having a stationary base 11 and a rotatable, indexing turntable 12. The turntable is driven by an electric motor (not shown in the drawings) over a worm 13 and a wormwheel 14 attached to the table 12. A circular cam disc 15 is arranged on the center shaft 16 of the table and a microswitch 17 for precisely stopping the table 12 at the indexed points. The shaft 16 is hollow and is arranged for conducting hydraulic fluid to the top distributing head 18 in the center of the table 12. Hydraulic pipe lines 19, 20 lead the fluid to the shaft by way of a rotary joint 21.

Figure 2:
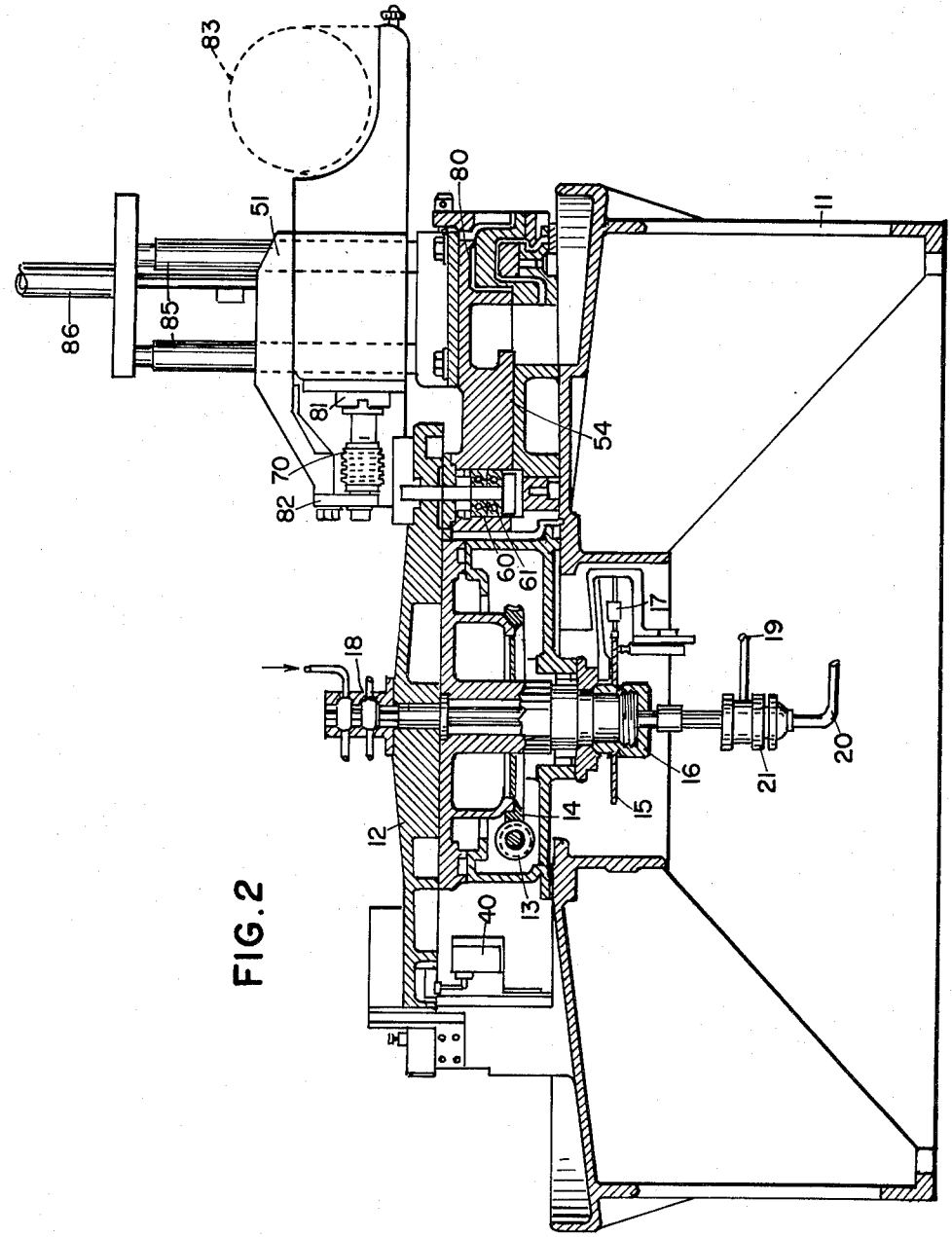
FIG. 2 is a cross-section of the machine, showing one of the milling heads not sectioned.
Figure 3:
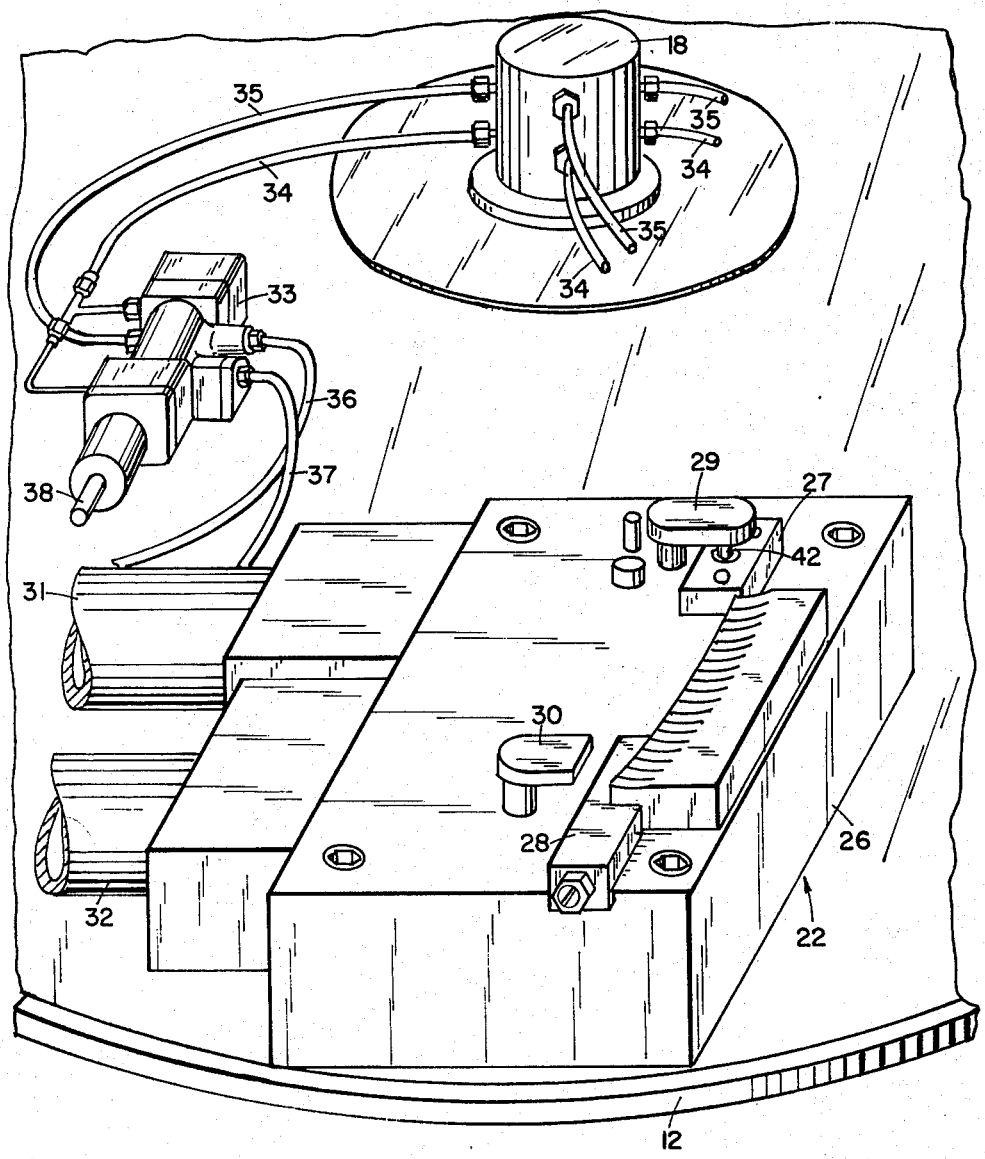
FIG. 3 is a view of the clamping fixture for the blades to be milled.

On the table 12, four identical, hydraulically-operated fixtures 22, 23, 24, 25 are arranged, equally spaced apart at 90° intervals near the periphery of the table 12. Each one of these fixtures 22, 23, 24, 25, as shown in FIG. 3, comprises a base 26 on which supports 27, 28 for the blades are mounted. Clamping bars 29, 30 are arranged over and opposed to said supports 27, 28, respectively, which can be lifted and lowered by corresponding hydraulic motors 31, 32 for unclamping and clamping a blade in said fixture 22. Hydraulic fluid is fed to controlling valves 33 by means of hoses 34, 35 from the distributing head 18, and from there to the hydraulic motors 31, 32 by hoses 36, 37. The valve stem 38 of each one of said controlling valves 33 is set in such manner that it will be located opposite an hydraulically driven actuator 39 every time the turntable 12 is indexed. The hydraulic actuator 39 is controlled by a microswitch 40 (schematically indicated in FIG. 2) for causing the unclamping and clamping operation of the clamping bars 29, 30 performed by the hydraulic motors 31, 32 in a timed cycle. This timed cycle also can be interrupted by means of one of the pushbuttons of the pushbutton control panel 41, and the clamping operation also can be manually performed by operating another pushbutton 41'. In each one of said fixtures is a centering stud 42 below the clamp 29, over which the pivotal bore of the pinking shear blade fits, which has been drilled and reamed with a very close tolerance. This stud 42 is of paramount importance and it can be seen from FIG. 3 that every blade which is to be milled only can be clamped in one position, whereby the stud 42 serves as the reference point.

Three milling devices 51, 52, 53 are located at positions 90° apart outside the periphery of the turntable 12. Each one of these milling devices is slidably arranged on its own circular base 54, 55, 56 and is operated reciprocatingly thereon by hydraulic motors 57, 59 and another hydraulic motor for device 52 (not visible in the drawing). The center point of each one of said circular bases 54, 55, 56 is a non-rotating shaft 60 about which the milling device 51 (52, 53) reciprocatingly swings. Anti-friction bearings 61 on said shaft secure a very precise motion of the milling device 51 (52, 53). The center line of said shaft 60 coincides at every indexing motion of said turntable 12 with the center lines of each one of said studs 42 of the fixtures 22, 23, 24, 25 so that virtually each one of the milling devices 51, 52, 53 reciprocatingly swings about the centerline of these studs 42 which are in fact the centers of rotation of the blades of the pinking shears. Since the vertical center point of the milling tool holder 81 also coincides by design with the centerline of the shaft 60 and thus, with the centerline 42 of the fixture, every contour which is cut by a milling tool 70 has to be precisely circular about this center point. Obviously all serrations milled by the milling tool 70 would match later with the serrations which have been milled in the same manner.

Each one of the milling devices 51, 52, 53 consists of a base 80 which is slidably mounted on its circular base 54 (55, 56). In this base 80 is a milling arbor 89 located in the conventional manner of any milling machine (not shown in the drawing). A conventional counterhead 82 is extending in front of the base 80 for holding the arbor 89 in a front bearing (not shown). Each one of said arbors 89 is independently driven by an electric motor 83 by way of belts and pulleys (guards 84 only shown). Guide posts 85 are arranged on each one of the milling devices 51, 52, 53 and a hydraulic cylinder 86 is provided for lifting the entire milling device upwardly during the return stroke of the hydraulic motors 57, 58, 59. Hydraulic fluid lines 87 are arranged for supplying the fluid to the lifting cylinders 86. A central hydraulic power supply is not shown in the drawing, since such hydraulic power supply device is obvious and does not belong to the invention.

All motions of the individual devices are electrohydraulically controlled. A central timing device is arranged in the switchboard panel (not shown in the drawing).

The machine operates as follows:

When the electric power is "on" all motors driving the milling cutters start running, and the hydraulic power supply device also starts. The first fixture 22, which is either open after the previous operations had been stopped, or which is manually opened, is loaded with a blade to be milled. The operator now starts the timed, automatic cycle. The clamps 29, 30 close, the table 12 is indexed 90°, bringing the fixture 22 into the precise alignment of stud 42, shaft 60 and the vertical centerline of the counterhead 82. Actuated by a microswitch (not visible in the drawing) all three milling devices 51, 52, 53 perform simultaneously their working stroke, are lifted at the end of the stroke by the cylinders 86 and return automatically to their starting point. Meanwhile, it is assumed that the turntable 12 is counterclockwise indexed, fixture 25, which was empty, had been moved into the loading position and had been opened by the contact of the stem 38 of its controlling valve 33 so that a new blade can be inserted, using the pivot 42 for precise centering, the preset central timing device now causes the clamps 29, 30 to close and starts a new cycle by indexing the table by another 90°. By continuing the operation in this manner, finished blades will be taken out of the opened fixture and new blades will be inserted instead, so said continuous production is achieved for which the operator only has to take the finished blades out and to insert an unfinished, new one during the time which is preset on the central timing device.

The precision of the manufacturing process is achieved by dividing the total milling process into three steps: the first milling head pre-cuts the serrations and at the same time finishes in the same stroke one flank of the serrations, the second head cuts the head of the blade off to the precise length and the third head performs the finishing cut on the serrations. Since each milling tool only performs a part of the total operation, the tool life is greatly extended while at the same time the speed of the operation is increased. Furthermore, the total production is improved since no "dead time" such as occurs in reciprocating individual operations exists.

While the invention has been described and illustrated with respect to a certain preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

I claim:

1. In a machine tool for milling pinking shear blades, said blades having pinking serrations, the combination with hydraulically operated fixtures for holding said blades, of arcuately reciprocatingly moved milling tool devices, said fixtures having a centering stud for locating said blades properly, said arcuately moved milling devices having a pivot, said pivot coinciding precisely with said centering stud at the instant of said milling device performing its milling operation on one of said blades held in one of said fixtures.

2. In a machine tool for milling pinking shear blades according to claim 1, and said milling devices having hydraulically operated lifting means for lifting said devices out of operating contact with one of said blades at the end of the working stroke, keeping said device in its lifted position during the return stroke thereof and lowering said device prior to the start of the working stroke.

References Cited in the file of this patent

UNITED STATES PATENTS

| 323,175 | Marsh | July 28, 1885 |
| 1,784,972 | Newbrough | Dec. 16, 1930 |
| 1,825,721 | Forward et al. | Oct. 6, 1931 |
| 1,849,683 | Milholland | Mar. 15, 1932 |
| 2,122,356 | Bullard et al. | June 28, 1938 |
| 2,606,482 | Sorensen et al. | Aug. 12, 1952 |

FOREIGN PATENTS

| 26,836 | Finland | Sept. 30, 1954 |
| 1,212,150 | France | Oct. 19, 1959 |